E. S. HALSEY.
AUTOMATIC ABSORBER REFRIGERATOR.
APPLICATION FILED APR. 30, 1915.
Patented July 23, 1918.
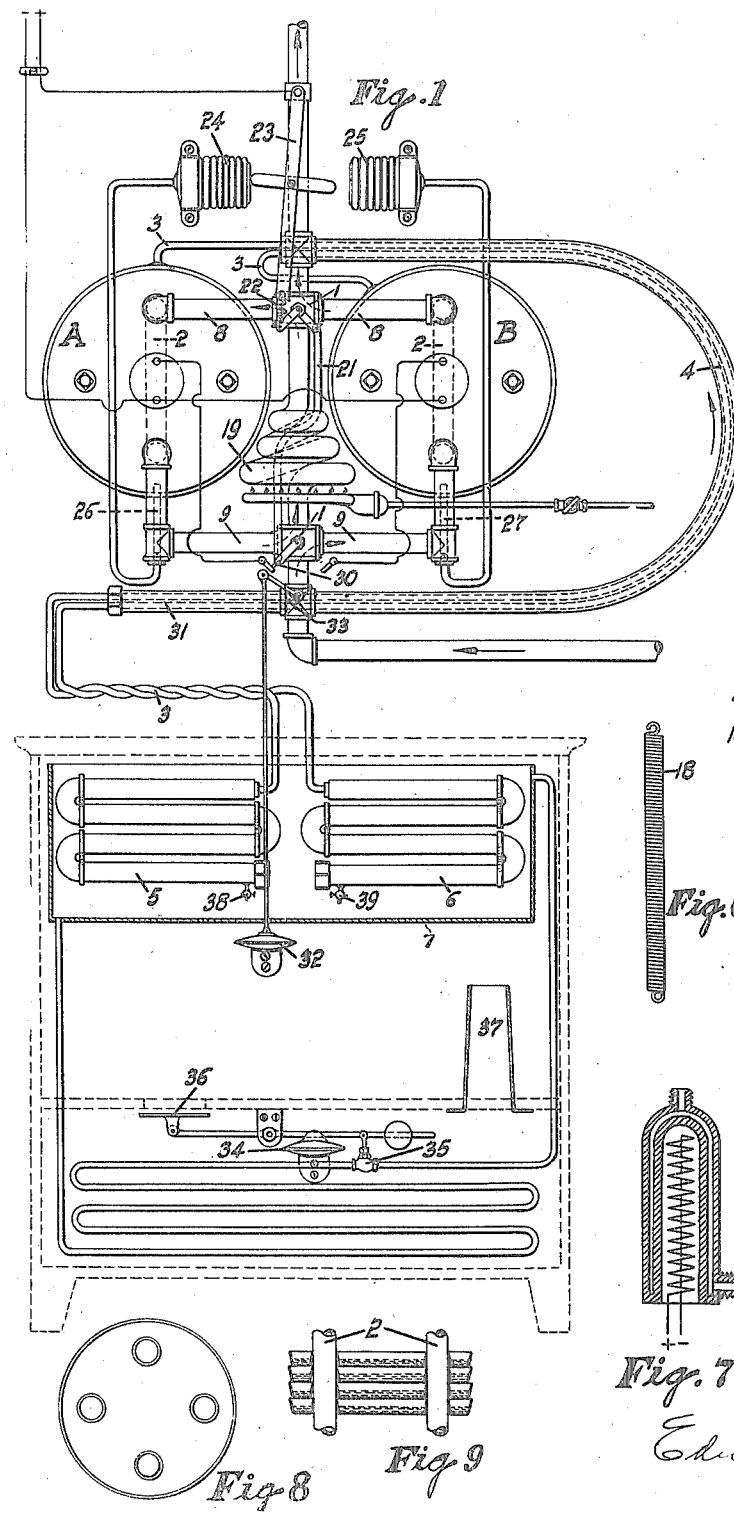
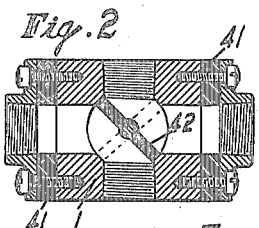
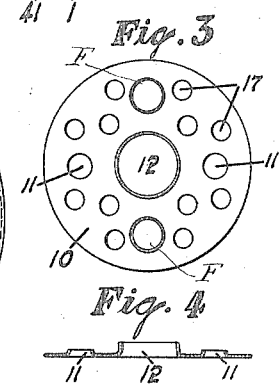
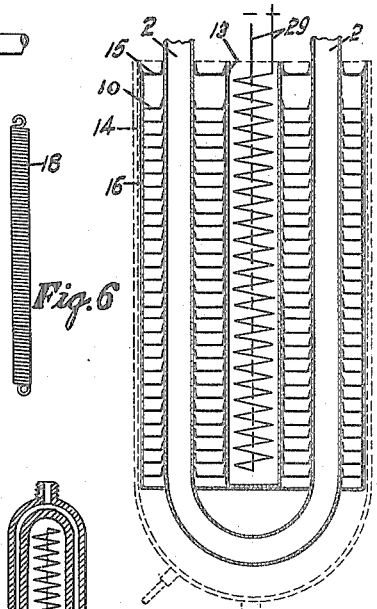
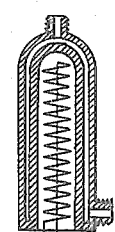
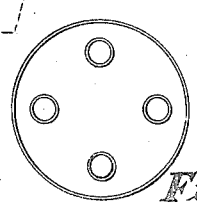
Inventor
Edward S. Halsey

UNITED STATES PATENT OFFICE.

EDWARD S. HALSEY, OF ALBANY, NEW YORK.

AUTOMATIC ABSORBER-REFRIGERATOR.

1,273,364.  Specification of Letters Patent.  Patented July 23, 1918.

Application filed April 30, 1915. Serial No. 25,026.

*To all whom it may concern:*

Be it known that I, EDWARD S. HALSEY, a citizen of the United States, and resident of Albany, in the county of Albany and State of New York, have invented certain new and useful Improvements in Automatic Absorber-Refrigerators, set forth in the following specifications and claims.

The nature of my invention is similar to that set forth in my application of March 6th, 1915, Serial Number 12,503, and has particular bearing on twin absorber-generators working in conjunction with twin receiver-refrigerating coils or surfaces.

The object of my invention is first to devise a simple dependable automatic device for alternately shifting the heating and cooling effect from one absorber-generator to the other so that at least one absorber will be cooling at any time, providing a continuous operation of refrigeration, also continuous gas generation so long as the heat is turned on to the machine, but so adapted that the machine can be set to generate refrigerating gas continuously throughout the night or during such hours as the electrical or gas heating agent may be purchased at the lowest price, and to provide improved means of charging the generator. The further object of my invention is to provide temperature regulation for various compartments of the chest that may be connected with the machine, and further, to provide improvements in the generator itself to overcome weaknesses and increase the efficiency thereof over that of my predecessors.

Referring to the drawings which illustrate my invention similar numeral or letters refer to similar parts throughout the several views in which Figure 1., is a diagrammatical rear elevation of a refrigerating chest with the twin absorber-generators and operating mechanism mounted on top thereof with the pipe connections to cooling coils within the chest. Fig. 2., is a cross section through a hot and cold water switching valve, 1, Fig. 3., is a plan view and Fig. 4., a central cross section through an aluminum heat absorbing diaphragm disk for the absorber generator. Fig. 5., is a longitudinal cross section through the center of one of the absorber cylinders. Fig. 6., is a spiral venting tube therefor while Fig. 7., is a cross sectional view of a modification of the electrical heating unit, while Figs. 8., and 9., are respectively a plan and elevated cross section of a modification of the aluminum absorber disks, 10.

To describe the action and application of my device it should first be understood that I have chosen to illustrate my invention as applied to dry absorbers in the foregoing figures, except Figs. 8 and 9 which are for wet absorbers, and the greater part of my invention applies equally well to wet absorbers. The two absorber cylinders, A. and B., are mounted horizontally above the ice chest paralleling each other with the U-shaped water circulating coils, 2—2, arranged with the loops in an up and down position or with one leg above the other to facilitate thermal circulation of the water through said loops. These generator cylinders are constructed as most particularly illustrated in Fig. 5, by a great number of the perforated aluminum heat conducting disks more particularly shown in Figs. 3., and 4., and essentially provided with contacting bearings or collars, 11, and 11, pressed up out of the metal slightly smaller in diameter than the outside of the water circulating pipe, 2, so that when they are pressed down over the two respective branches of said U-shaped pipe one at a time by a suitable arbor press to form intimate metallic contact of high heat conduction with said pipe, and in such cases as in which the electrical heating unit is embodied in the generator absorber as illustrated most particularly in Fig. 5., there is also a contact collar 12, therefore drawn up in the center of said disk to make a perfect heat conducting metallic connection with the central heating tube, 13, which is sealed at the inner end. In the above case the central tube is supported in a clamp with the bent end of the U tube and the disks forced over them one at a time preferably spaced about three-eighths of an inch apart and the complete thermal unit consisting of the water circulating tube, the central heating tube and the stack of aluminum conducting disks are thus assembled prior to their introduction to the cylinder, 14, indicated by a dotted line. They also have assembled with them in a similar manner the iron cylinder head, 15, which is gas welded to the ends of the tubes and also welded into the cylinder after the assembled unit has been introduced therein.

These aluminum disks or diaphragms when used with dry absorbers perform a further important function than that of conducting the heat and cooling circulation to all parts of the mass of the absorber, which is to partition and prevent said material from packing or concentrating itself by settling.

In order to charge these multiple absorber sections I use a dry absorber which preferably is calcium chlorid, as nearly anhydrous as may be secured and preferably in screened porous particles averaging an eighth of an inch in diameter. To introduce these I provided a pair of one half inch filling holes, F and F, through the aluminum diaphragms. As these register perfectly throughout the stack and have a threaded opening through the cylinder head, 15, in exact line with them, I may pour the calcium pellets down these two passages when the cylinder is standing directly on end either before or after this composite thermal unit is introduced into the absorber cylinder. I preferably do this prior to introducing said unit as there is an an enveloping screened casing, 16, surrounding the outer edges of the disk to prevent the particles from falling out. This screen, which is not original with me, performs the further function of providing a gas space between the absorber mass and the outer cylinder. As this is entirely inadequate, however to allow the gas to permeate freely throughout the dry absorbing mass after it has been ammoniated, I have provided a distributed series of perforated vent holes, 17, about one quarter of an inch in diameter, throughout that portion of the disks least accessible from the outer edge. In each of these holes I provide a close wound wire spring, 18, shown most particularly in Fig. 6, being normally only two thirds or three fourths the length of the aluminum disk stack. I fish one of these springs through each of these vent holes throughout the length of the stack dilating the spring under tension so that its two extremities may be anchored by cross pins outside the two end disks so that the refrigerating gas may pass through these springs and reach every section of the absorber mass. By pouring the chlorid particles down through the two filling holes aforesaid and occasionally and systematically jarring the unit the particles are uniformly distributed not only through each section of the stack but also form a uniform layer over the top surface of each disk. Whereupon I first run a pointed iron rod down each filling hole to clear it and then fix a dilated spring of about three eighths inch diameter in the center of each of these filling holes to prevent the particles from shifting from one section to another. By carefully holding the cylinder in an upright position while it is sealed into the cylinder and ammoniated by anhydrous ammonia gas from a cylinder under pressure, all these particles of chlorid are swelled up into an amorphous porous mass, nearly or completely filling each partitioned section throughout so that when the ammonia is driven out again from its chemical combination by the applied heat this loose amorphous spongy mass retains its form as a delicate structure supported on either side by its wide contact with the aluminum conducting plates. This mass being an extremely poor conductor of heat is incapable of being effectively cooled or heated to any appreciable depth in the mass, which has been the point of failure of my predecessors, but by my net work of high conducting metal reaching to every section throughout the mass and making perfect metallic heat connection to the prime heating or cooling tube, I effectively overcome this trouble. I find aluminum by far the most satisfactory metal for this purpose as it and copper are the only two common metals having high conduction of heat and copper is more or less affected by ammonia.

A pair of these absorbing cylinders are mounted above the refrigerating chest as aforesaid. A small tube, 3, for the refrigerating fluid leads from one end of each of the cylinders through a water circulating pipe, 4, bent in a half circle, both emerging through a plug at the bottom end of this pipe, and after a short travel of intimate association they pass through the top of the refrigerating chest to separate receiving refrigerating coils, 5 and 6, which is submerged in a brine tank, 7. The two upper ends of the water loop, 2, of the generators are cross tied by a water pipe, 8, through a four port cross valve, 1. The bottom ends of these U shaped water loops drop down a short distance to T connectors which are cross connected by a connection, 9, through another four way crossed valve like the above, particularly shown in Fig. 2. This cross valve is fitted with a butterfly centrally pivoted so that by a movement or oscillation through 90 degrees the rising circuit of hot water from the gas heated worm, 19, may be deflected either to the right hand generator or to the left hand generator and likewise in the case of the bottom cross valve the rising circuit of cooling water may alternately be reversed first to one and then the other of the loops, 2, of the generator absorbers so that one will be circulating hot water while the other is circulating cooling water and as the two valves are tied together by the bent connecting rod, 21, they must co operate in their action to secure the said result. The upper valve being directly operated through the spring, 22, by the cross lever, 23, which is alternately oscillated by the pressure diaphragms, 24, and 25.

which are actuated respectively by pressure through small tubes leading to the metal capsules, 26, and 27, which are inserted through the two T's connections to the two bottom ends of the water loops from the two generators. These capsules are filled with a volatile liquid, boiling at the maximum temperature of the generators which would be determined by the character of absorber and refrigerating agents used. In the case of ammonia and calcium chlorid being used, I prefer to have these operate at about 250 degrees, F.

When the generating cylinder and the water passing out of the bottom of the loop reaches the predetermined temperature the capsule-filling volatilizes and dilates its connected diaphragm which throws the lever, 23, pass center whereupon the tension of spring, 22, rocks the valve, 1, suddenly through the arc of 90 degrees with its connected companion valve reversing the heating and cooling circuits through the generator absorbers and consequently reverses the absorbing and generating action in them.

I have devised the arrangement also whereby the electric current heating the cartridge coil, 29, in the center of the cylinders is simultaneously switched from one generator to the other by the electrical connection and switch, 30, fixed to the lower valve, 1, so that the machine may be operated either electrically or by gas or both simultaneously as may be desired. I have also shown in Fig. 7, as a modification, a water jacketed, electrical cartridge heating unit, which could be substituted for the gas heated worm, 19, to make a straight electrical machine in which the heat would be on continuously without an automatic switch operating in an equivalent manner to the continuous burning gas heater which I have shown connected.

By harnessing the two generators together as I have with independent pressure systems, there being no connection between their interiors, I secure a continuous refrigerating effect without any ammonia valves to leak or bind or cause other trouble so that the machine will remain in operating condition indefinitely. The two refrigerant or ammonia pipes, 3 and 3, by being run in close association both through the dead end, 31, and between there and the receiving coils by being twisted together conserve the heat losses which would otherwise transpire between the freezing point at which the gas leaves the refrigerating coil and the temperature of approximately 75 at which the condensed ammonia descends from the condenser. By this arrangement the warm ammonia in trickling down from the condenser in one pipe is chilled to the freezing point by the ascending gas in its companion pipe.

I divide my refrigerating chest into upper and lower compartments; the upper one which may be regulated close to the freezing point by the thermostat, 32, actuating the butterfly valve, 33, through a vertical connecting rod through the top of the chest so as to increase or decrease the flow of cooling water and consequently the rate of absorption, thereby regulating the rate of refrigeration. This upper and colder section of the chest contains the receiver-refrigerator coils, 5 and 6, which in this case I have shown submerged in a brine tank, which however is not essential. From the bottom of this brine tank I run a small brine circulating pipe which passes directly down into the lower compartment which may be maintained at the desired temperature somewhat above freezing by the thermostat, 34, which is adapted to actuate the globe valve, 35, through a push stem so as to increase the brine circulation as the temperature of the compartment increases or cut it off altogether when the temperature falls below normal. This circulating pipe is so arranged as to circulate upon the thermal-siphon principle, the weight of the liquid in the warmer or rising arm being lighter than in the colder or descending arm.

I have also devised a second means of controlling the temperature of this lower compartment, consisting of an air valve, 36, controlling an opening in the partition between the two compartments actuated by the thermostat, 34, working in conjunction with the circulating stack, 37, conducting the warmer air from the upper part of the lower compartment into the upper compartment and allowing the colder air from the upper compartment to pass by the valve, 36, whenever the thermostat becomes expanded from a slight excess in temperature in the lower compartment.

In order to properly charge the machine and get it into efficient working condition, after sealing the calcium chlorid in the absorbers as described and connecting the piping and valves as shown, the absorbers having previously been fully saturated with ammonia while in a vertical position, the machine is started up by the application of heat and with the two vent cocks, 38 and 39, slightly opened, respectively in turn, and submerged in water, the air remaining in the absorbers and in the piping is discharged through the water; and when the air bubbles cease the vent cocks are closed and the machine operated for several cycles, care being taken to carry the temperature up, during these cycles, to the maximum limit so as to drive off the remnants of moisture which may have been picked up and held by the calcium chlorid, which will usually amount to about 2%. This moisture having collected in the bottom of the receiving coils, 5, and 6, may be concentrated at this point by re-absorption of the greater part of the ammonia and the residue of aqueous ammonia blown off through the pet cocks, 38, and 39, in turn leaving the charge of ammonia and calcium chlorid almost perfectly anhydrous so that maximum efficiency may be secured.

Much difficulty has been experienced by former experimenters with this specific type of absorbing machines by the failure to expel the air from the system, or its incomplete elimination, as the air although compressed to a small fraction of the total space originally held by it at atmospheric pressure, may allow the ammonia to circulate to some degree, its presence even in small quantities, I have determined, being diffused with ammonia gas, accumulates at the absorber end during absorption and makes absorption sluggish by practically filtering the ammonia through it in its progress to the absorber; and likewise on the reverse cycle, blocks the progress of the ammonia through the condensing pipes and receiver by its diffusion and accumulation at the bottom end by virtue of it greater specific gravity.

To reduce the conduction of heat from the cooling side to the heating side of the cross valve, 1, or vice versa, I have introduced heat insulating joints, 41, and 41, and further, have constructed the butterfly, 42, of said valves from insulating material. My machine is so designed that the heater, 19, may be run continuously when adjusted low, or may be turned higher to charge the receivers rapidly.

I claim:

1. In a device of the class described a pair of absorber-generators; a dual looped cooling circuit constituting two equivalent shunt pipe loops branching off respectively through said absorber-generators and joining again into a common water flow pipe with an automatic deflecting valve so located at one of the junctions of said shunts as to alternately deflect the flow through one of said shunts and then through the other; and a heating duct constituting a third shunt connecting between and terminating at the two aforesaid junctions so as to automatically circulate hot water through either of said outside shunts while the other is being cooled.

2. In a device of the class described in combination with a generator-absorber; an automatic water circulator constituted by a heated riser, 19, and a shunt loop, 2, through said generator absorber adapted to form a short circuit with said riser circulating hot water through said circuit; and an expansion vent to a common cold water pressure supply system to permit the water temperature in said circuit being raised above 212 degrees without ebullition; and an automatic means of discontinuing said hot flow and directing said cold water through said absorber-generator branch of said loop at a proper phase of the cycle of operation.

3. In a device of the class described a pair of absorber generators; a pair of combination heating and cooling water shunting loops therefor passing through their respective absorber generators; a common cold water flow pipe connecting with and alternately circulating cold water through each of said loops; a central water heating shunt connecting with said loops through intervening insulating joints and a water deflecting valve.

4. In a device of the class described a pair of absorber-generators in combination with a pair of dual purpose loops, 2, and 2, forming two outside shunts uniting with a central heating shunt and a main water flow pipe; and a four port cross valve, 1, having its central deflecting valve, 42, swinging through an abrupt cross angle for the purpose specified.

5. In a device of the class described a pair of refrigerant charged alternately operating absorber-generators, A, and B; a pair of receivers, 5, and 6, therefor, within a common refrigerating space without intercommunicating refrigerant pressure connections; a pair of refrigerant ducts, 3, and 3, connecting said absorber generators, each with their respective receivers running parallel with each other through a common condenser and continuing for an appreciable distance below said condenser closely thermally associated before connecting with their respective receiving refrigerating coils for the purpose specified.

6. In a device of the class described a pair of twin absorber generators provided with a pair of thermal pressure shifting motors adapted to expand at a pre-determined maximum temperature of their respective absorber-generators; an energy storing retarding spring for said thermal motors; and a snap action, heat shifting lever adapted to be rocked back and forth by said thermal motors whenever their respective accumulating pressure overbalances said spring each time either absorber generator reaches said maximum temperature.

7. In a device of the class described a composite heat absorbing unit built up of a large multiple of heat conducting disks pressed over the pipe, 2, being equally spaced thereon and making intimate metallic contact therewith; and a series of filling holes through said disk substantially as shown and described.

8. In a device of the class described as an interior skeleton structure for an absorber-generator, a composite thermal cell unit, built up of a large number of punched heat conducting perforated metal disks having a registering series of contact holes by which each disk is respectively pressed down over a common heat conducting pipe making solid metallic contact with each of them for the purpose specified.

9. In an absorber-generator cylinder a stack of perforated metal disks in intimate contact with a common cooling pipe; a multiple of suitable venting channels running lengthwise through said stack of disks and said perforations paralleling said cooling pipe for the purpose specified.

10. In an absorber-generator cylinder of a refrigerating machine a uniformly cellularly distributed charge of a suitable dry, porous absorbing material; a composite cellular thermal skeleton unit constituted by a large multiple of stacked closely spaced perforated aluminum disk cells for said absorbing material, thermally united by a suitable, continuous metallic conductor running lengthwise of said stack; and suitable means provided for directly thermally connecting each of said aluminum disk cells with said common conductor for the purpose specified.

11. In an absorber generator filled with a dry absorbing material a venting system for the interior of the mass to allow its free permeation by the refrigerant vapor consisting of a long spirally wound spring, partially dilated extending throughout the mass.

Having described my invention I hereunto set my hand this 26th day of April, 1915.

EDWARD S. HALSEY.